Oct. 15, 1935. A. J. GRANBERG 2,017,345
PUMPING AND METERING SYSTEM FOR TANK TRUCKS
Filed Jan. 30, 1934
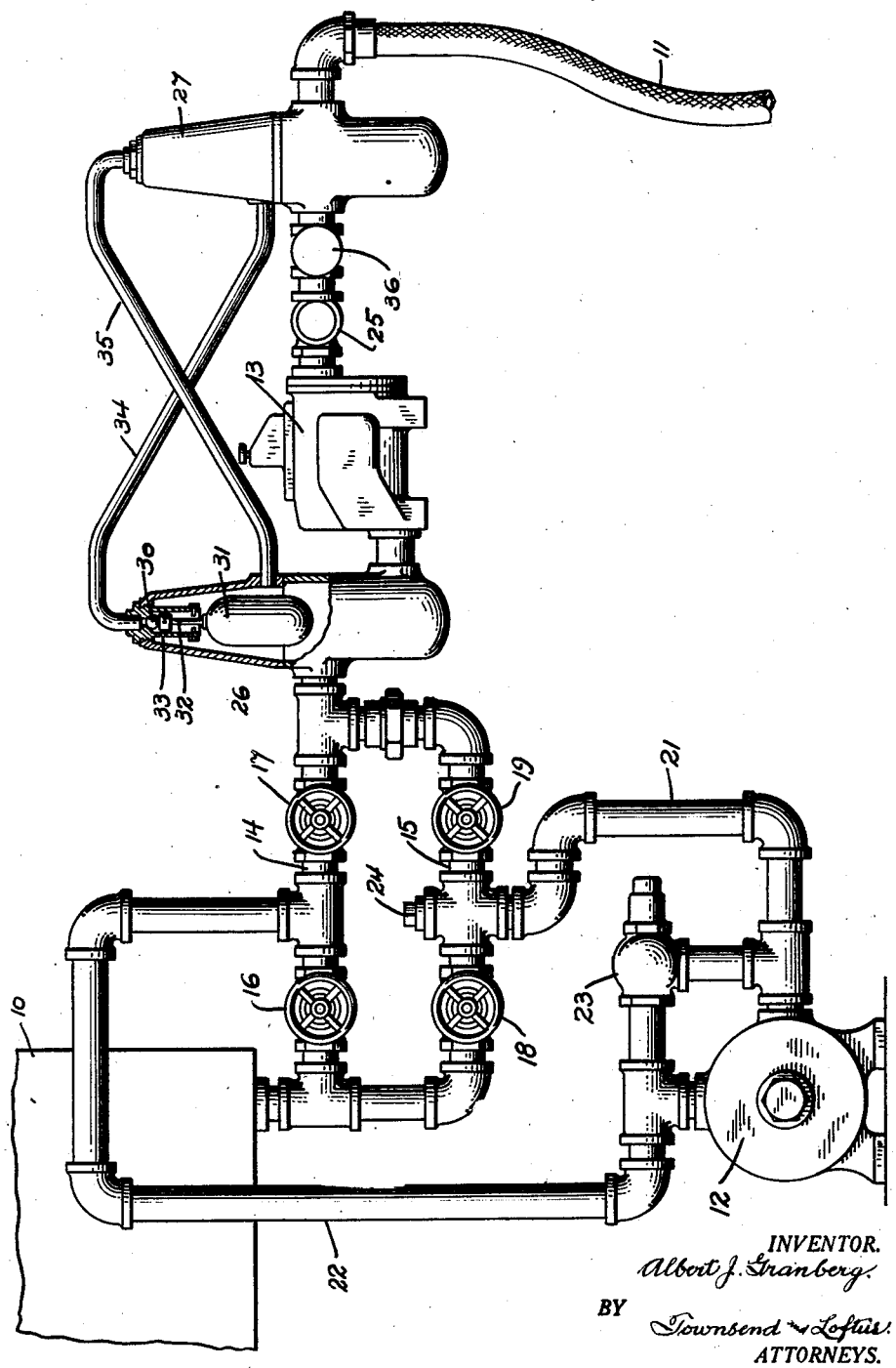
INVENTOR.
Albert J. Granberg.
BY Townsend Loftis.
ATTORNEYS.

Patented Oct. 15, 1935

2,017,345

UNITED STATES PATENT OFFICE 2,017,345

PUMPING AND METERING SYSTEM FOR TANK TRUCKS

Albert J. Granberg, Berkeley, Calif., assignor to Ralph N. Brodie Company, Oakland, Calif., a corporation of California Application January 30, 1934, Serial No. 708,972

1 Claim. (Cl. 221—95)

This invention relates to fluid pumping systems and more particularly to a novel combination of pump, meter, liquid control valves and air release valves, by which it is made possible to pump a liquid in either of two directions through a pipe line and to measure accurately the volume of liquid so pumped in either direction.

An example of an instance in which the invention may be used is cited so that the utility of the novel features involved may readily be understood. Fuel oils are customarily delivered to the consumer by tank trucks, or the like, traveling on the level of the streets. Where the consumer's tank or reservoir is disposed below the street level, the oil will of course gravitate from the truck to the reservoir and may be metered accurately as it flows from the truck with little difficulty. However, in many instances, due to lack of space beneath the street level or due to the fact that the consumer takes advantage of gravity to feed fuel to his plant, the reservoir is placed in an elevated position. This makes it necessary for the tank truck to carry a pump for forcing the oil to the reservoir. After the required volume of oil has been pumped to an elevated reservoir, the oil remaining in the line which supplies the reservoir must be returned to the tank truck due to ordinances prohibiting oil from remaining in such lines. The oil in the line having already been metered, its quantity must be determined so that the customer will be properly credited when it is returned to the truck tank.

It is the principal object of the present invention to provide a pumping and metering system for truck tanks by means of which oil or other fluid may be pumped from a tank truck or other source of supply to a secondary tank and accurately metered, and then oil delivered in excess of the desired quantity pumped back into the truck tank and accurately metered so that the amount delivered to the secondary reservoir will agree accurately with the amount desired; the said system also being so designed as to prevent air entering the meter while pumping in either direction and rendering its reading inaccurate.

One form of my invention is exemplified in the following description and illustrated by way of example in the accompanying drawing in which—

The figure is a schematic view with parts partially in section illustrating an installation of a pumping and metering system embodying my invention.

Referring more particularly to the drawing, a truck tank or other source of supply is illustrated by the numeral 10. Oil from the tank 10 may be discharged through a supply hose 11 which will be suitably fitted for connection with the supply line of a reservoir. A pump 12, which may be driven by any convenient source of power, such as the motor of the truck, imparts pressure to the oil flowing from the tank 10 to the supply hose 11; and a meter 13 interposed in the line connecting the tank 10 with the supply hose 11 registers the volume of oil. Connecting the truck tank 10 and the meter are a pair of parallel pipe lines, generally indicated at 14 and 15, which are connected for communication with each other in the manner of a by-pass. The line 14 includes two valves 16 and 17, and the line 15 similarly includes two valves 18 and 19. The suction intake of the pump 12 is connected by means of a line 21 with the line 15 at a point intermediate the valves 18 and 19, and the discharge outlet of the pump 12 is connected by a line 22 with the line 14 intermediate the valves 16 and 17.

The mechanism thus far described operates as follows: When oil is to be delivered from the tank 10 to a consumer's reservoir, the supply hose 11 is connected with the supply line of the reservoir, the valves 17 and 18 are opened, and the pump 12 set in operation, it being understood that the valves 16 and 19 are at this time closed. Oil is therefore pumped from the tank 10, through the valve 18, suction line 21, pump 12, discharge line 22, valve 17, meter 13, and supply hose 11. When the desired amount of oil has been registered by the meter 13, the valves 17 and 18 are closed and the valves 16 and 19 are opened. This opening and closing of the valves may be accomplished without stopping the pump, as the pump is fitted with the customary by-pass relief valve, such as indicated at 23, permitting communication between the discharge and suction lines when the pressure in the discharge line reaches a predetermined excessive point. Thus without stopping or reversing the direction of the pumping action, the direction of flow of the fluid being pumped is reversed, as with the valves 16 and 19 open, any oil which may be in the supply line leading to the reservoir is drawn back through the supply hose 11, through the meter 13, valve 19, pump 12, valve 16, and returned to the tank 10. The meter 13 is preferably of the displacement type and therefore is operated equally well by liquid flow in either direction. After the liquid in the reservoir supply line has been pumped back into the tank 10, the meter reading during this last pumping operation is deducted from the volume pumped to the reservoir to ascertain the quantity actually delivered.

This installation of pump and valves is also useful for other purposes. For example, a plug 24 is illustrated at the connection of the suction line 21 with the line 15. This plug may be removed and a hose or other suitable conduit fitted to the opening and led to the bottom of a tank for pumping out sludge or water. For this operation the valve 16 alone is open and the sludge or water is drawn through the pump and directed into the tank 10 so that it may be carried away and deposited at some suitable place. An outlet 25 is also provided adjacent the delivery end of the meter 13 for the purpose of filling cans or drawing small quantities of oil from the tank 10 by gravity. The outlet 25 is preferably fitted with a standard type of truck faucet and by opening the valves 16 and 17, oil will gravitate from the tank through the meter and into any suitable receptacle through the outlet 25.

It is a matter of common knowledge that meters of the displacement type will meter air as well as the liquid which was intended to be metered, and therefore it is desirable to employ an air release valve for trapping any air in the liquid before it passes through the meter and by-passing it to the line at the delivery end of the meter. Such a valve is illustrated at 26. However, in the present installation where liquid is being pumped through and registered by the meter 13 in both directions, the single valve 26 would not be adequate and I have therefore provided a valve 27 at the opposite side of the meter and connected it with the valve 26 in the manner to be described so as to by-pass air around the meter 13 regardless of the direction of flow of the liquid being metered. The valves 26 and 27 are of conventional construction and are substantially identical. Each comprises a hollow casing provided with suitable connections for interposing it in the line of liquid flow. A ball valve 30 controls an opening at the uppermost end of the casing. A float 31 guided by a stem 32 in a cage 33 is maintained in a position closing the ball valve when the casing contains liquid. When air enters the casing it seeks the uppermost end thereof and when the air collecting in the casing is of sufficient volume to displace a predetermined quantity of liquid, the float 31 recedes with the liquid level and permits opening of the ball valve 30. A conduit 34 receives the air escaping through the open valve and by-passes it around the meter and into the other air release valve. A similar conduit 35 by-passes the air in the opposite direction when the meter is operating in reverse.

A spring balanced check valve 36 is placed in the line between the air release valves 26 and 27. This valve may be of any conventional type that will permit flow of liquid in either direction, restricting the flow only sufficiently to aid in the separation of the air before it enters the meter.

While I have illustrated my invention and described the same more or less specifically, it should be understood that various changes may be resorted to in the construction and arrangement of the several parts within the scope of the appended claim.

Having described my invention, what I claim is—

In combination with a tank, a meter for metering fluid flowing to and from said tank, two pipe lines forming communication between the tank an meter, two valves in each of said lines, a pump, a conduit connecting the suction inlet of the pump with one of said lines between its two valves, a conduit connecting the discharge outlet of the pump with the other of said lines between its two valves, whereby said valves may be operated to cause the pump to pump fluid either from the tank to the meter or from the meter to the tank, a pair of air release valves positioned one on each side of the meter, and air conduits so connected to said valves that air in the fluid line will by-pass the meter regardless of the direction of flow through the meter.

ALBERT J. GRANBERG.